United States Patent
Kwon

(10) Patent No.: US 8,644,987 B2
(45) Date of Patent: Feb. 4, 2014

(54) ROBOT AND WALKING CONTROL APPARATUS AND METHOD THEREOF

(75) Inventor: Woong Kwon, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 522 days.

(21) Appl. No.: 12/654,537

(22) Filed: Dec. 22, 2009

(65) Prior Publication Data

US 2010/0179688 A1    Jul. 15, 2010

(30) Foreign Application Priority Data

Jan. 9, 2009    (KR) .................. 10-2009-0001756

(51) Int. Cl.
     *B62D 57/032*     (2006.01)

(52) U.S. Cl.
     CPC .............. *B62D 57/032* (2013.01); *Y10S 901/01* (2013.01)
     USPC .............................................. 700/245; 901/1

(58) Field of Classification Search
     USPC .......... 700/245, 253, 250; 318/568.12, 568.2; 901/1
     See application file for complete search history.

(56) References Cited

U.S. PATENT DOCUMENTS

2005/0049748 A1*   3/2005   Lee et al. ................. 700/245
2005/0107916 A1*   5/2005   Nagasaka ................. 700/245

OTHER PUBLICATIONS

Kajita et al., "Biped Walking Pattern Generator Allowing Auxiliary ZMP Control", IEEE/RSJ International Conference on Intelligent Robots and Systems, Oct. 2006, pp. 2993-2999.*
Dimitrov et al., "On the Implementation of Model Predictive Control for On-Line Walking Pattern Generation," IEEE International Conference on Robotics and Automation, May 2008, pp. 2685-2690.*
Kwon et al., "Biped Humanoid Robot Mahru III", 7th IEEE-RAS International Conference on Humanoid Robots, Nov. 2007, pp. 583-588.*
Kajita et al., "Biped Walking Pattern Generation by Using Preview Control of Zero-Moment Point", IEEE International Conference on Robotics and Automation 2003, vol. 2, Sep. 2003, pp. 1620-1626.*

\* cited by examiner

*Primary Examiner* — James Trammell
*Assistant Examiner* — Todd Melton
(74) *Attorney, Agent, or Firm* — Staas & Halsey LLP

(57) ABSTRACT

Disclosed are a robot, in which a walking pattern of the robot is changed into a new walking pattern by stages when it is necessary to suddenly change the walking pattern to promote stabilization in walking, and a walking control apparatus and method thereof. When the walking pattern is changed, a preview time is decreased by stages and then is restored to its original state and thus it is possible to prevent the robot from losing its balance.

15 Claims, 13 Drawing Sheets

ROBOT AND WALKING CONTROL APPARATUS AND METHOD THEREOF

CROSS-REFERENCE TO RELATED APPLICATIONS

This application claims the benefit of Korean Patent Application No. 2009-0001756, filed Jan. 9, 2009, in the Korean Intellectual Property Office, the disclosure of which is incorporated herein by reference.

BACKGROUND

1. Field

The present invention relates to a robot and a walking control apparatus and method thereof, and more particularly to a biped robot, the walking of which is stabilized, and a walking control apparatus and method thereof.

2. Description of the Related Art

Biped walking robots (hereinafter, referred to as biped robots), which have a joint system similar to that of a human being and easily walk with two feet in human working and living spaces, have been vigorously researched and developed.

Now, most biped robots have a walking pattern, in which the robot walks only when the waist of the robot moves on a level plane being parallel with the ground by bending its knee.

In order to achieve stable walking of a biped robot, the biped robot should walk according to a walking pattern, which is calculated in advance. However, when the walking pattern is only reproduced, various instability factors (a ZMP error, a landing error, a landing time error, a landing impact, etc.) may be generated. In preparation for these factors, a separate walking stabilization control algorithm, such as correction of the walking pattern, is added to achieve the stable walking of the robot.

However, since the algorithm generates the walking pattern on the assumption that a footprint trajectory is set in advance, when the walking pattern, calculated in advance, is suddenly changed in order to avoid an obstacle, correspond to user's instructions, or to balance the robot against excessive external force, rapid acceleration is generated and thus the robot cannot achieve stable walking.

SUMMARY

Therefore, one aspect of the invention is to provide a robot, which achieves stable walking when the walking pattern of the robot is suddenly changed, and a walking control apparatus and method thereof.

Another aspect of the invention is to provide a robot, which changes a walking pattern into a new walking pattern by stages, and a walking control apparatus and method thereof.

Additional aspects and/or advantages will be set forth in part in the description which follows and, in part, will be apparent from the description, or may be learned by practice of the invention.

The foregoing and/or other aspects of the present invention are achieved by providing a robot, which performs walking according to a walking pattern, including a walking pattern generating unit to generate a new walking pattern, into the changed walking pattern, by varying a preview time when the walking pattern is changed.

The preview time may be decreased to be shorter than a reference time, and then is restored to its original state.

The robot may further include a footstep planner to receive walking instructions of the robot and generate footstep data according to the walking instructions, and the footstep planner may change the footstep data corresponding to the preview time.

The footstep planner may change the number of data segments belonging to the footstep data to change the footstep data.

The foregoing and/or other aspects of the present invention are also achieved by providing a walking control apparatus of a robot including a footstep planner to generate footstep data according to walking instructions; and a walking pattern generating unit to generate a walking pattern according to the footstep data, wherein the footstep planner changes the footstep data, when the walking pattern is changed.

The footstep planner may decrease the footstep data of the former walking pattern and increase footstep data of a new walking pattern, into which the former walking pattern is changed. The footstep planner may decrease or increase the footstep data by stages. The footstep planner may change the footstep data according to a change rule designating a change type of the footstep data. The footstep planner adds data to the footstep data of the changed walking pattern, when the current motion of the robot is completed.

The foregoing and/or other aspects of the present invention are also achieved by providing a walking control method of a robot including receiving walking instructions; determining whether or not it is necessary to change a walking pattern by analyzing the walking instructions; and generating a new walking pattern, into which the walking pattern is changed, comprising varying a preview time when it is necessary to change the walking pattern.

Footstep data generated according to the walking instructions may be changed to vary the preview time.

The change of the footstep data may be achieved by decreasing the footstep data of the walking pattern and increasing footstep data of the changed walking pattern. The change of the footstep data may be carried out by stages. The change of the footstep data maybe carried out according to a change rule designating a change type of the footstep data. The change of the footstep data may be achieved by adding data to the footstep data of the changed walking pattern, when the current motion of the robot is completed.

BRIEF DESCRIPTION OF THE DRAWINGS

These and/or other aspects and advantages of the invention will become apparent and more readily appreciated from the following description of the embodiments, taken in conjunction with the accompanying drawings in which.

DETAILED DESCRIPTION

Figure 1:
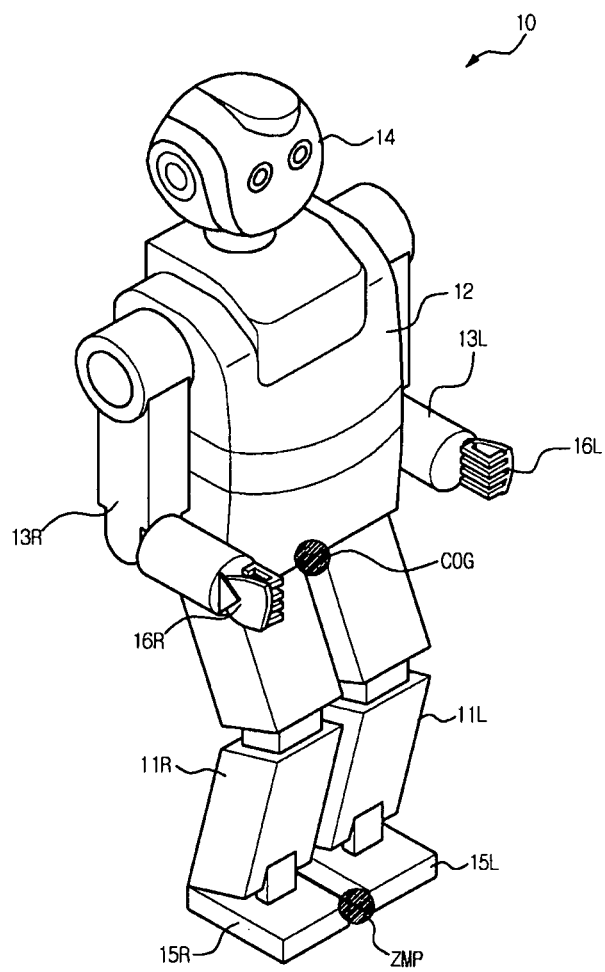
FIG. 1 is a view illustrating the external appearance of a robot in accordance with one embodiment of the present invention.

Reference will now be made in detail to the embodiment of the present invention, an example of which is illustrated in the accompanying drawings, wherein like reference numerals refer to like elements throughout. The embodiment is described below to explain the present invention by referring to the annexed drawings.

FIG. 1 is a view illustrating the external appearance of a robot in accordance with one embodiment of the present invention.

In FIG. 1, a robot 10 in accordance with this embodiment is a biped walking robot, which walks upright with two legs 11R and 11L in the same way as a human being, and includes a torso 12, two arms 13R and 13L and a head 14 provided at the upper portion of the torso 12, and feet 15R and 15L and hands 16R and 16L respectively provided at tips of the two legs 11R and 11L and the two arms 13R and 13L. Here, R represents the right side of the robot 10, L represents the left side of the robot 10, COG represents the center of gravity of the robot 10, and ZMP represents a point on the contact surface between the robot 10 and the ground, where the moment in the direction of the X-axis (roll axis, i.e., the walking direction of the robot) and the moment in the direction of the Y-axis (pitch axis, i.e., the step width direction of the robot) are zero.

When walking instructions, such as a walking speed, the number of steps, a step width, etc., are given, target positions and directions of both feet (right and left feet) 15R and 15L are determined, and a COG pattern satisfying a ZMP constraint between COG and ZMP to generate a walking pattern to make position and direction trajectories of both feet 15R and 15L according to time is obtained based on the determined positions and directions of both feet 15R and 15L.

On the assumption that COG moves only on a constraint plane being parallel with the ground, the relationship between ZMP and COG by a kinematical equation is represented by the following expression 1, and the expression 1 is referred to as a ZMP constraint.

$$\ddot{y} = \frac{g}{z_c}(y - p_y),$$
$$\ddot{x} = \frac{g}{z_c}(x - p_x).$$
[Expression 1]

Here, x and y are respectively COG patterns in the walking direction (the direction of the X-axis) of the robot 10 and in the step width direction (the direction of the Y-axis) of the robot 10, px and py are respectively ZMP trajectories in the walking direction (the direction of the X-axis) of the robot 10 and in the step width direction (the direction of the Y-axis) of the robot 10, Zc is a height of COG on the constraint plane, and g is an acceleration of gravity.

Figure 2:
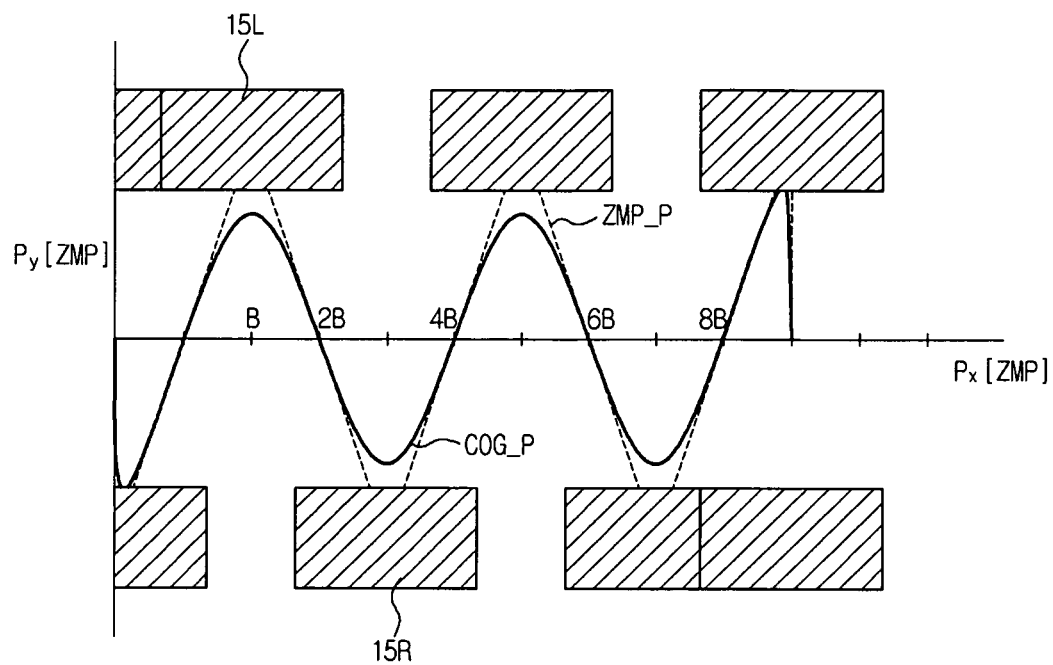
FIG. 2 is a view illustrating the relationship between ZMP and COG in accordance with one embodiment of the present invention.

FIG. 2 is a view illustrating the relationship between ZMP and COG in accordance with one embodiment of the present invention. Here, ZMP_P represents ZMP trajectories in the walking direction (the direction of the X-axis) of the robot 10 and in the step width direction (the direction of the Y-axis) of the robot 10, which are shown in a wavy line on an X-Y plane, and COG_P represents COG patterns in the walking proceed direction (the direction of the X-axis) of the robot 10 and in the step width direction (the direction of the Y-axis) of the robot 10 satisfying the ZMP constraint, which are shown in a solid line on the X-Y plane. B represents a half of a step width.

As shown in FIG. 2, in order to allow the walking robot 10 to achieve stable walking, points on the ground, where the sum total of moments is zero, i.e., points, on which both feet 15R and 15L will be set, should be predetermined, and ZMP trajectories to predetermined support phases, such as a double support phase (hereinafter, referred to as a 'DSP') and a single support phase (hereinafter, referred to as a 'SSP'), should be set.

The points, on which both feet 15R and 15L of the robot 10 will be set, are generally described by a periodic function, and the support phases are used to transfer the ZMP. In the SSP, while a swinging leg makes a step, the ZMP should remain in the sole of a supporting leg. In the DSP, the ZMP should be rapidly transferred from the inside of the sole of the rear supporting leg to the inside of the sole of the front supporting leg. In order to perform the continuous and stable walking of the robot 10, the above process needs to be repeated.

Figure 3:
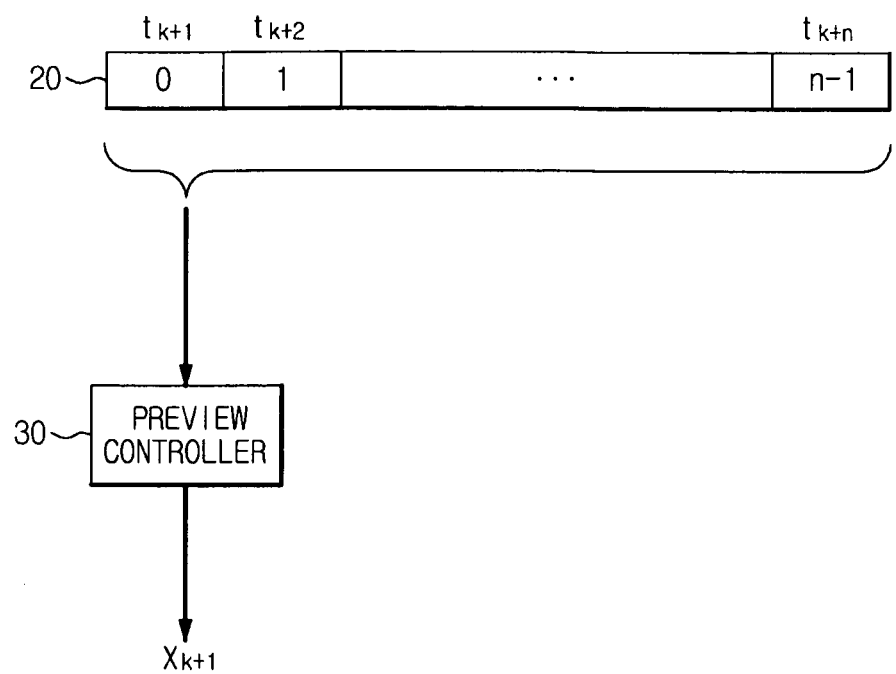
FIG. 3 is a view to explain the concept of a ZMP preview control method in accordance with one embodiment of the present invention.

A preview control method is one method in which an instruction ZMP is made according to walking instructions (i.e., walking speed, the number of steps, a step width, etc.) and a COG pattern satisfying the ZMP constraint is obtained from the instruction ZMP. Since the COG pattern according to a random instruction ZMP trajectory is directly obtained using an optimum control theory, the ZMP preview control method is employed by most humanoid robots. With reference to FIG. 3, in the ZMP preview control method, an instruction ZMP trajectory for a designated time in the future (hereinafter, referred to a preview time) is stored in a ZMP buffer memory 20, and a preview controller 30 obtains a COG pattern Xk+1 from the optimum control input. It is possible to achieve the stable walking of the robot 10 by reproducing a walking pattern generated based on such a COG pattern.

Figure 4:
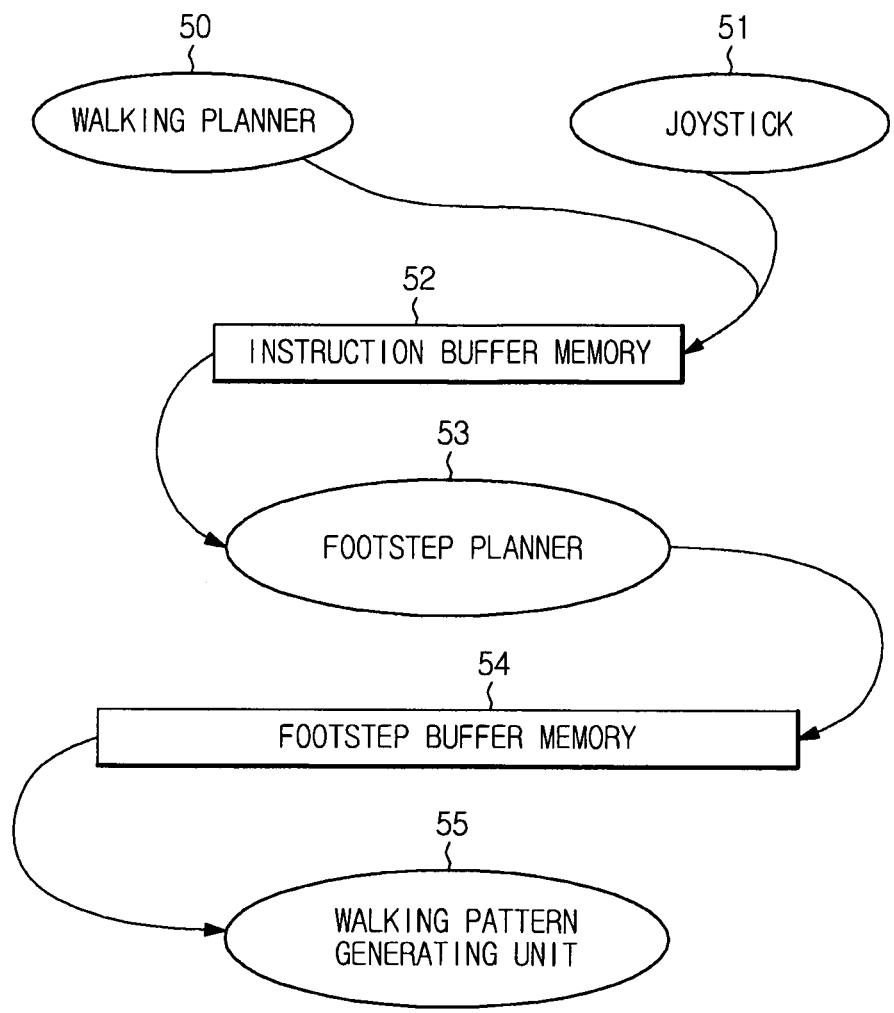
FIG. 4 is a block diagram of a walking control apparatus of a robot in accordance with one embodiment of the present invention.

FIG. 4 is a block diagram of a walking control apparatus of a robot in accordance with one embodiment of the present invention.

Walking instructions are provided through an input unit, such as a walking planner 50 or a joystick 51. The walking instructions are stored in an instruction buffer memory 52. The walking planner 50 serves to recognize the voice or gesture of a user providing the walking instructions or receive instructions of an upper-level planner, which is not shown, and to make the walking instructions control the pose of the robot. Here, the walking instructions include a moving direction, a moving distance, a position, and a speed of the robot, etc.

The instruction buffer memory 52 is a of virtual memory, which outputs instructions by a first in first out (FIFO) method, and thus outputs walking instructions to a footstep planner 53 according to the input order.

The footstep planner 53 generates footstep data based on the walking instructions provided from the instruction buffer memory 52, and provides the generated footstep data to a footstep buffer memory 54. The generation of the footstep data is successively carried out every preview time. The footstep data is data, which represent directions and positions of the footsteps to form the COG pattern made according to the preview control method.

The footstep buffer memory 54 stores the generated footstep data, and provides the footstep data to a walking pattern generating unit 55 according to input order. Then, the walking pattern generating unit 55 makes an instruction ZMP according to the footstep data, and obtains a COG pattern by the ZMP preview control method, thus generating a walking pattern based on positions and directions of both feet and the torso of the robot.

Figure 5A:
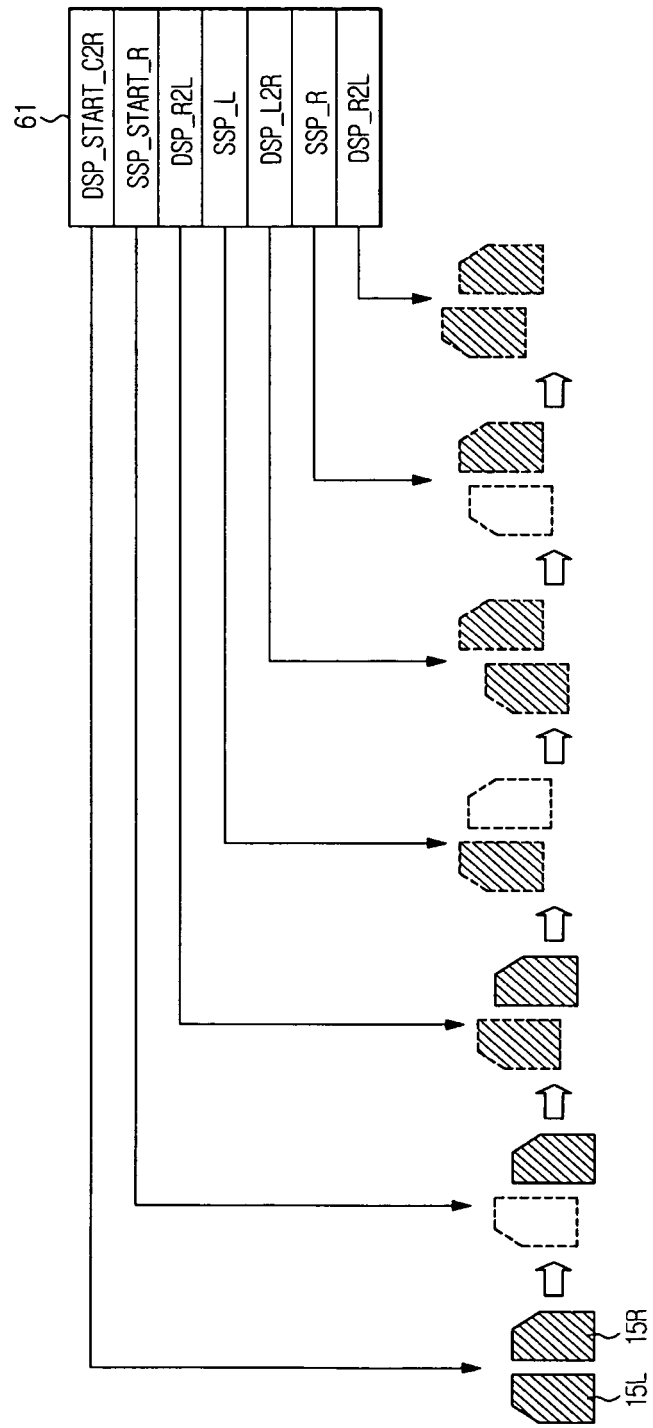
FIGS. 5A and 5B are views illustrating footstep data applied to the walking control apparatus in accordance with one embodiment of the present invention and walking states thereby.
Figure 5B:
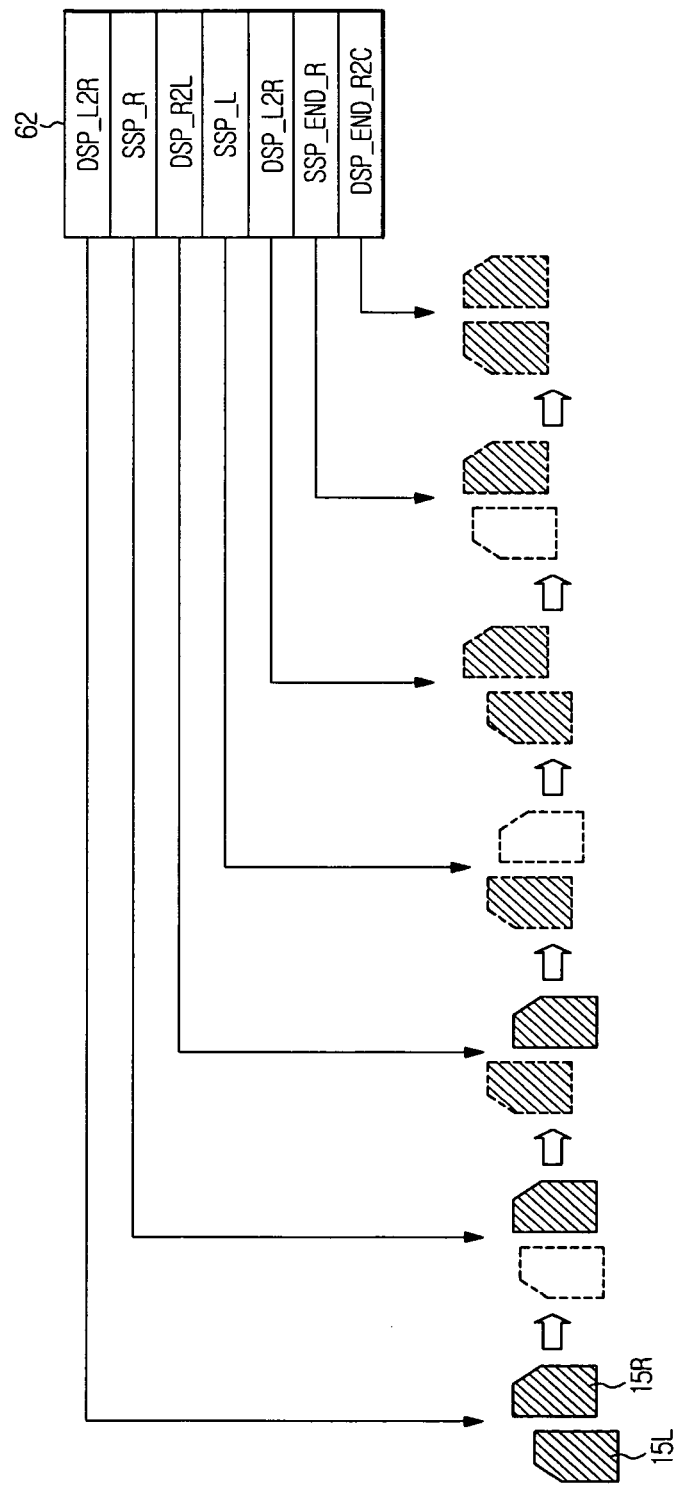

FIGS. 5A and 5B are views schematically illustrating footstep data applied to the walking control apparatus in accordance with one embodiment of the present invention and walking states thereby.

In FIGS. 5A and 5B, each of footstep data 61 and 62 includes 7 footstep data segments. These footstep data segments indicate positions and directions of footsteps corresponding to the preview time (or designated footsteps). The footstep data 61 of FIG. 5A is applied when the robot is changed from a stoppage state to a forward movement state, and the footstep data 62 of FIG. 5B is applied in case that the robot is changed from the DSP state to the stoppage state. Here, DSP-L2R represents a motion of the robot, in which the ZMP is transferred from the left foot to the right foot in the DSP state, SSP_L represents a state of the robot, which is supported with the left foot. Further, C represents the center of the torso of the robot, START represents the initial stage of the walking of the robot, and END represents the final stage of the walking of the robot. The initial or final stage of the walking of the robot may have a more elongated duration time to achieve the stable walking of the robot. That is, in the footstep data segment SSP_START(END)_R(L), the swinging leg moves forward by a step width, and in the footstep data segment SSP_L(R), the swinging leg moves forward by twice the step width.

When the walking pattern of the robot is suddenly changed from positions predicted in real time due to a change for obstacle avoidance, a correspondence to user's instructions, and a step to balance the robot against excessive external force, the acceleration of the COG pattern may be rapidly changed. Thereby, excessive force may be applied to a robot mechanism, and thus cause walking instability of the robot and falling of the robot.

In accordance with the embodiment of the present invention, when the calculated walking pattern needs to be suddenly changed, the footstep planner 53 changes the footstep data stored in the footstep buffer memory 54. At this time, the footstep data applied to the current walking pattern is not changed into other footstep data at once, but the footstep data at a point of time to require the change of the walking pattern is gradually decreased and footstep data of a walking pattern, into which the current walking pattern will be changed, is gradually increased. The preview time is varied according to this change of the footstep data. That is, the preview time is elongated when the number of the footstep data segments is large, and the preview time is shortened when the number of the footstep data segments is small. By varying the preview time, it is possible to prevent the rapid generation of the acceleration of the COG pattern to make the walking pattern.

Now, a method of changing the footstep data will be described.

Figure 6:
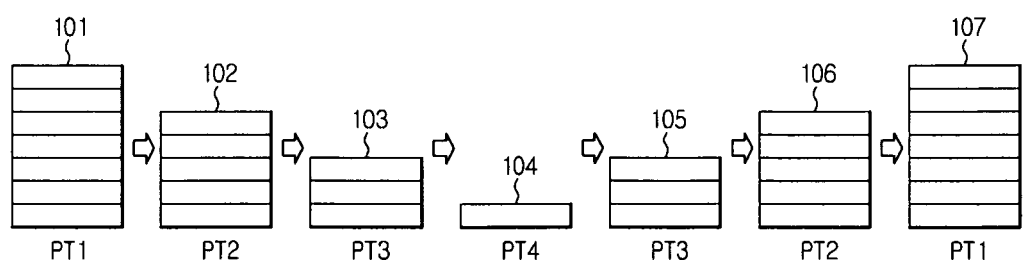
FIG. 6 is a view illustrating the principle of change of the footstep data in the walking control apparatus in accordance with one embodiment of the present invention.

In FIG. 6, when it is expected that a first footstep data 101 of a reference preview time PT1 is applied to the robot 10, when the walking pattern is suddenly changed and thus it is necessary to apply second footstep data 107 to the robot 10, the preview time is gradually decreased and then increased. At this time, plural footstep data 102, 103, 104, 105, and 106 having a preview time being shorter than the reference preview time PT1 are provided by stages between the first footstep data 101 and the second footstep data 107.

The shorter the preview time is, the smaller the number of data segments is. For example, the footstep data 102 does not include some of the data segments belonging to the first footstep data 101, and the footstep data 104 having the shortest preview time includes the smallest number of data segments. Thereafter, the footstep data 105 having a slightly increased preview time includes only some of the data segments included in the second footstep data 107, and the footstep data 106 having a greater preview time further includes other of the data segments included in the second footstep data 107.

When it is necessary to suddenly change the walking pattern, the change of the walking pattern is carried out by stages using the footstep data, the preview times of which are varied, provided between the first footstep data 101 and the second footstep data 107. Here, the number of stages of the procedure of changing the footstep data and which data segments are excluded are not limited, and proper change rules are selected according to conditions of the robot requiring the change of the walking pattern, i.e., the walking states of the robot. Hereinafter, the selection of these change rules will be exemplarily described.

FIGS. 7A to 7E are views respectively illustrating changes of the footstep data according to change rules, which are applied to the changes of the footstep data, in the walking control apparatus in accordance with one embodiment of the present invention.

Figure 7A:
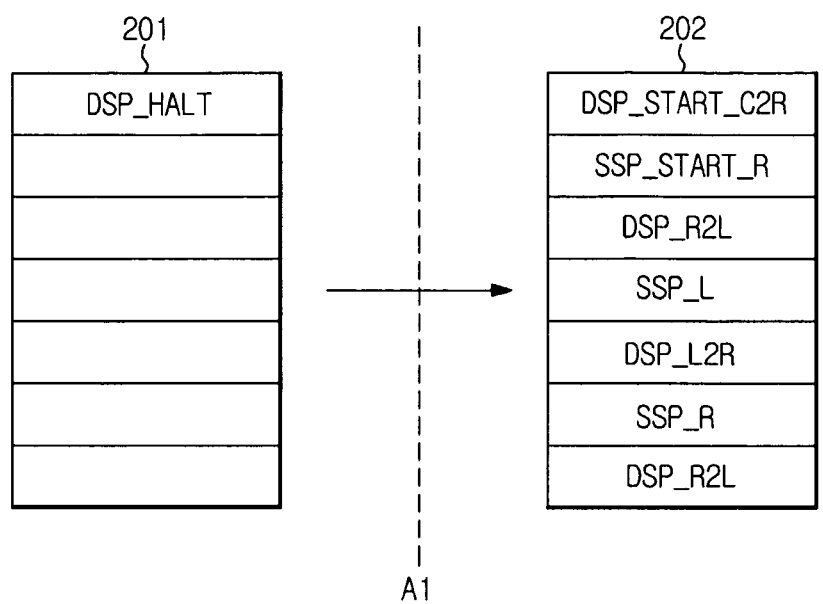
FIGS. 7A to 7E are views respectively illustrating changes of the footstep data according to change rules in the walking control apparatus in accordance with one embodiment of the present invention.

FIG. 7A illustrates a first change rule applied to the robot when the robot starts walking in a stoppage state. When a change to start the walking of the robot in the stoppage state is required A1, the former footstep data 201 is abandoned and new footstep data 202 is applied to the robot.

Figure 7B:
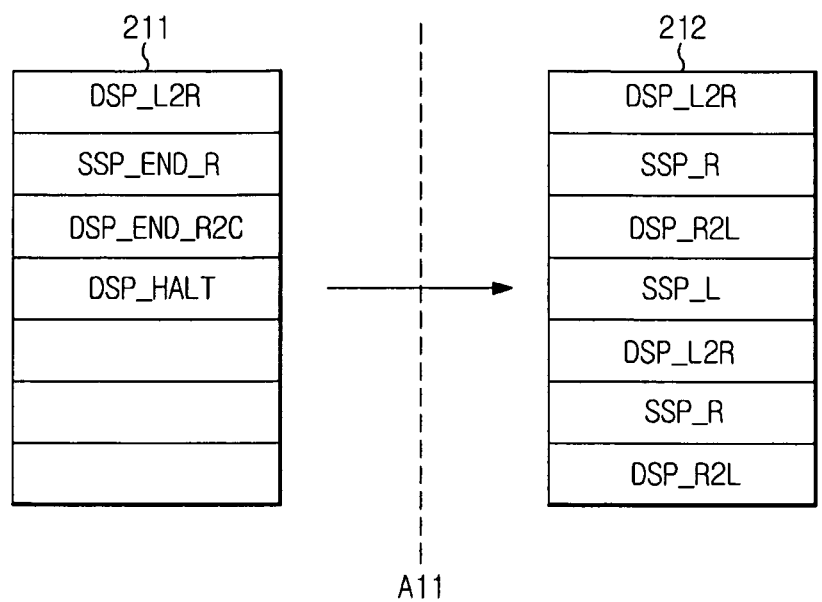

FIG. 7B illustrates a second change rule applied to the robot when the robot re-starts walking in a stoppage motion taking state. When a change to start the walking of the robot in the stoppage motion taking state is required A11, the former footstep data 211 is abandoned and new footstep data 212 is applied to the robot.

Figure 7C:
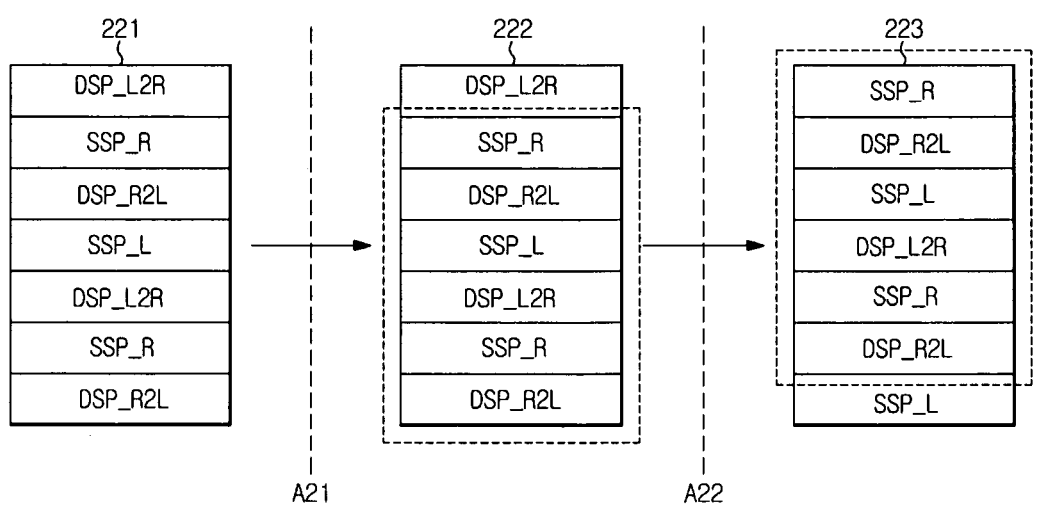

FIG. 7C illustrates a third change rule applied to the robot when the robot changes a walking speed during walking. When a change of the walking speed during walking is required A21, the former footstep data 221 is not directly abandoned but is maintained 222 for a designated time and then new footstep data 223 generated according to the change walking speed is applied to the robot at a point of time A22 when the designated time has elapsed. Here, the gradual increase in the amount of the footstep data 223, when the new footstep data 223 is applied to the robot, is the same as that shown in FIG. 6.

Figure 7D:
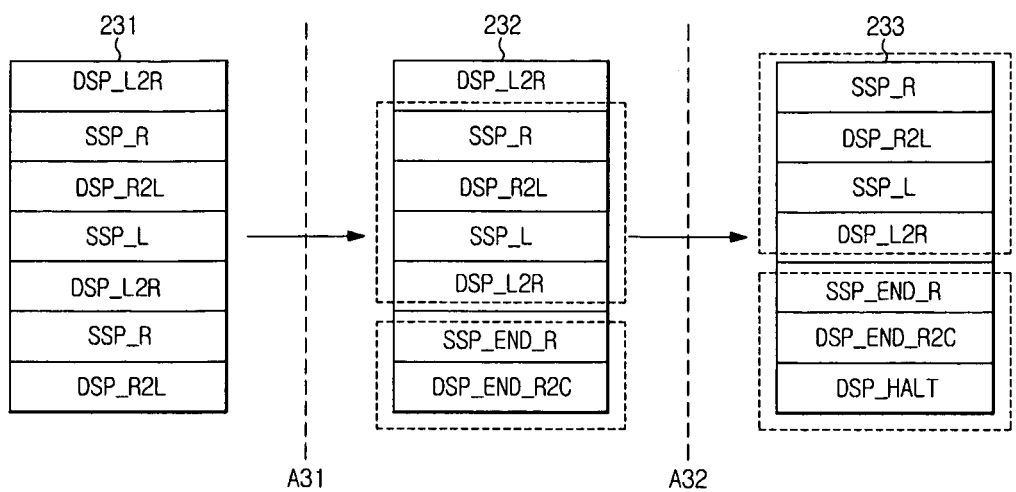

FIG. 7D illustrates a fourth change rule applied to the robot when the stoppage of the robot in the DSP state while the robot moves forward is required. When a change to stop the robot in the DSP state while the robot moves forward is required A31, new footstep data 232 including some footstep data SSP_END_R and DSP_END_R2C is applied to the robot from footstep data 241. Thereafter, new footstep data 233 further including a footstep data DSP-HALT to stop the robot is applied to the robot at a point of time A32 when the current motion of the robot has been completed. Here, the gradual increase in footstep data, when the new footstep data 232 and 233 is applied to the robot, is the same as that shown in FIG. 6.

Figure 7E:
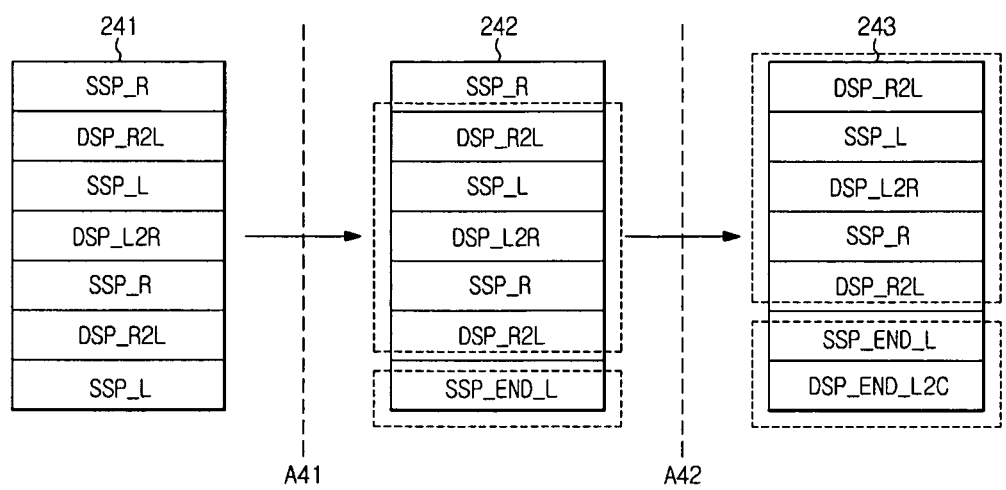

FIG. 7E illustrates a fifth change rule applied to the robot when the stoppage of the robot in the SSP state while the robot moves forward is required. In case that a change to stop the robot in the SSP state while the robot moves forward is required A41, new footstep data 242 including a footstep data SSP_END_L is applied to the robot. Thereafter, new footstep data 243 further including a footstep data DSP-END-L2C is applied to the robot at a point of time A42 when the current motion of the robot has been completed. Thereafter, the new footstep data 243 further includes a footstep data DSP-HALT to stop the robot, which is not shown. Here, the gradual increase in footstep data, when the new footstep data 242 and 243 is applied to the robot, is the same as that shown in FIG. 6.

When the change of the footstep data has been completed, footstep data is uniformly generated and thus the preview time is uniformly maintained also.

In addition to the above-described change rules, there are various change types of footstep data according to walking states of the robot, and these change types should be prepared in advance.

Figure 8:
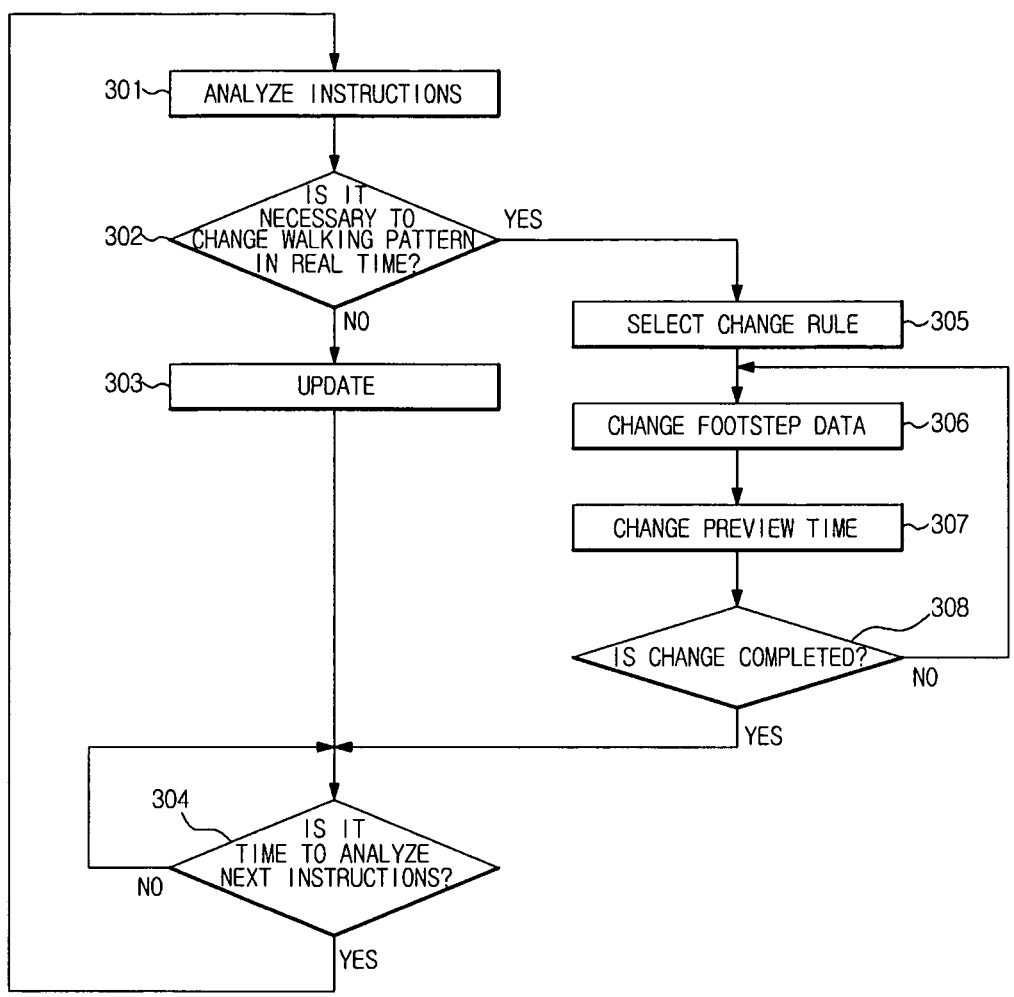
FIG. 8 is a flow chart illustrating a walking control method of a robot in accordance with one embodiment of the present invention.

Hereinafter, a walking control method of a robot in accordance with the embodiment of the present invention will be described with reference to FIG. 8.

Walking instructions, such as a walking speed, the number of steps, a step width, etc., are inputted to the walking planner 50 through a user's voice or gesture. Further, the walking instructions may be inputted to the walking planner 50 by an upper-level planner. Moreover, the walking instructions may be inputted to the walking planner 50 by an input unit, such as the joystick 51. The walking instructions are sequentially stored in the instruction buffer memory 52, and then are sequentially provided to the footstep planner 53 according to the input order. The footstep planner 53 analyzes the walking instructions (operation 301).

As a result of the analysis of the walking instructions, it is determined whether or not it is necessary to change the walking pattern of the robot in real time (operation 302). When the walking pattern of the robot needs to be changed in real time, the walking pattern is suddenly changed from predicted positions to a position changed in real time due to obstacle avoidance, user's instructions, or to balance the robot against excessive external force.

As a result of the determination of operation 302, when it is determined that it is unnecessary to change the walking pattern of the robot in real time, footstep data generated corresponding to a reference preview time is stored in the footstep buffer memory 54, and are updated (operation 303). Thereafter, it is determined whether or not it is time to analyze next instructions (operation 304). As a result of the determination of operation 304, when it is determined that it is time to analyze the next instructions, operation 301 is performed.

As a result of the determination of operation 302, when it is determined that it is necessary to change the walking pattern of the robot in real time, the footstep planner 53 selects a proper change rule according to the current walking state of the robot (operation 305). Here, the change rule may be selected from change rules, which are prepared in advance, instead of the change rules shown in FIGS. 7A to 7E.

The footstep data is changed according to the change rule selected by the footstep planner 53. Here, the change of the footstep data is carried out by stages. The footstep data is changed according to the change rule (operation 306), and the preview time is changed according to the change of the footstep data (operation 307).

The footstep planner 53 determines whether or not the change of the preview time is completed (operation 308). When the change of the preview time is completed, it is determined whether or not it is time to analyze next instructions in order to repeat the above process (operation 304). As a result of the determination of operation 304, when it is determined that it is time to analyze the next instructions, operation 301 is performed.

In accordance with the embodiment of the present invention, even when the walking pattern of the robot is suddenly changed due to a obstacle avoidance, user's instructions, or to balance the robot against excessive external force, the robot can perform stable walking. Thereby, it is possible to promote commercialization and popularization of biped walking robots.

Although an embodiment of the invention has been shown and described, it would be appreciated by those skilled in the art that changes may be made in this embodiment without departing from the principles and spirit of the invention, the scope of which is defined in the claims and their equivalents.

What is claimed is:

1. A robot, which performs walking according to a walking pattern, comprising:
   a walking pattern generating unit to generate a new walking pattern, into which the walking pattern is changed, by varying a preview time when the walking pattern is changed,
   wherein varying the preview time comprises at least one of elongating the preview time and shortening the preview time.

2. The robot according to claim 1, wherein the preview time is decreased to be shorter than a reference time, and then is restored to an original state.

3. The robot according to claim 1, further comprising a footstep planner to receive walking instructions of the robot and generate footstep data according to the received walking instructions,
   wherein the footstep planner changes the footstep data corresponding to the preview time.

4. The robot according to claim 3, wherein the footstep planner changes the number of data segments belonging to the footstep data to change the footstep data.

5. A walking control apparatus of a robot comprising:
   a footstep planner to generate footstep data according to walking instructions; and
   a walking pattern generating unit to generate a walking pattern according to the footstep data,
   wherein the footstep planner changes the footstep data such that a preview time varies, when the walking pattern is changed,
   wherein varying the preview time comprises at least one of elongating the preview time and shortening the preview time.

6. The walking control apparatus according to claim 5, wherein the footstep planner decreases the footstep data of the walking pattern and increases footstep data of a new walking pattern, into which the walking pattern is changed.

7. The walking control apparatus according to claim 6, wherein the footstep planner decreases or increases the footstep data in stages.

8. The walking control apparatus according to claim 6, wherein the footstep planner changes the footstep data according to a change rule designating a change type of the footstep data.

9. The walking control apparatus according to claim 8, wherein the footstep planner adds data to the footstep data of the changed walking pattern, when the current motion of the robot is completed.

10. A walking control method of a robot comprising:
    receiving walking instructions;
    determining whether or not it is necessary to change a walking pattern comprising analyzing the walking instructions; and
    generating, by a controller, a new walking pattern, into which the walking pattern is changed, comprising varying a preview time when it is necessary to change the walking pattern, wherein varying the preview time comprises at least one of elongating the preview time and shortening the preview time.

11. The walking control method according to claim 10, further comprising changing footstep data generated according to the walking instructions to vary the preview time.

12. The walking control method according to claim 11, wherein the changing of the footstep data comprises decreasing the footstep data of the walking pattern and increasing footstep data of the changed walking pattern.

13. The walking control method according to claim 12, wherein the changing of the footstep data comprises changing the footstep data in stages.

14. The walking control method according to claim 12, wherein the changing of the footstep data comprises changing according to a change rule designating a change type of the footstep data.

15. The walking control method according to claim 14, wherein the changing of the footstep data comprises adding data to the footstep data of the changed walking pattern, when the current motion of the robot is completed.

* * * * *